J. G. WALLMANN.
MOTOR CAR BRAKE.
APPLICATION FILED MAY 9, 1916.
1,250,397.
Patented Dec. 18, 1917.
4 SHEETS—SHEET 4.
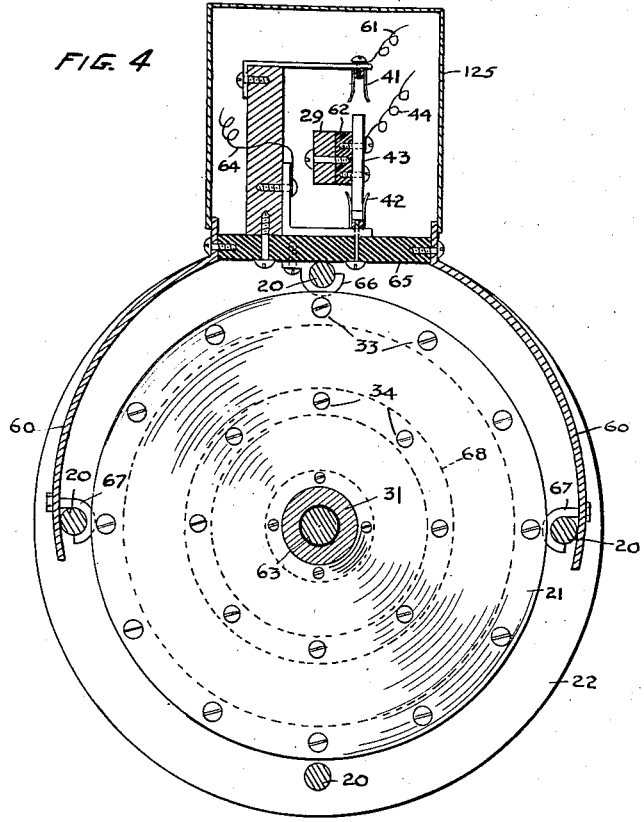
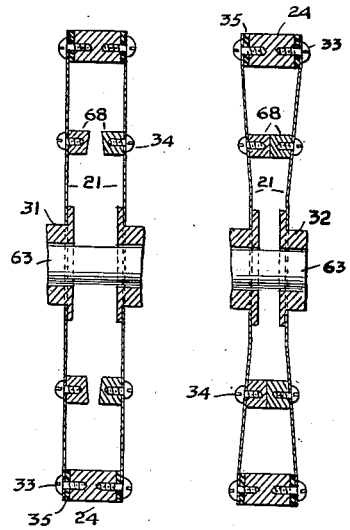
INVENTOR
Johann G. Wallmann,
by Lincoln Sonntag,
Attorney.

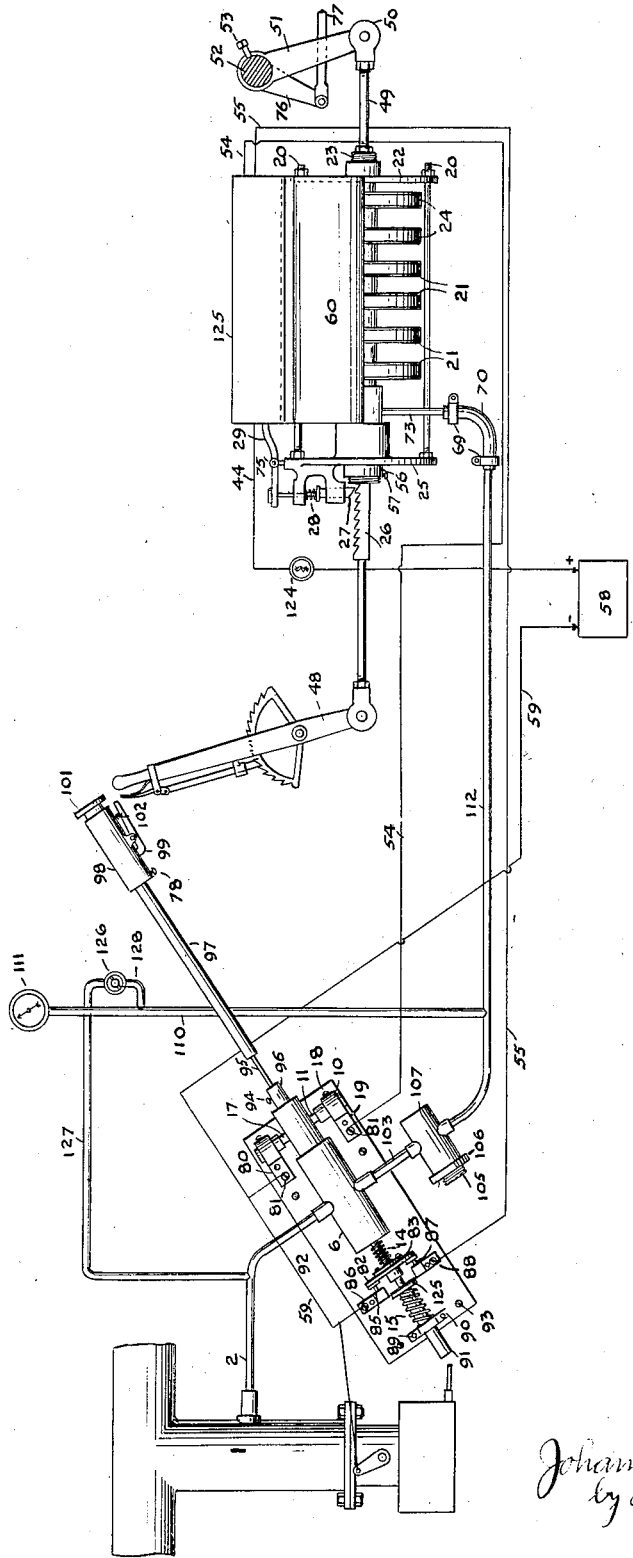

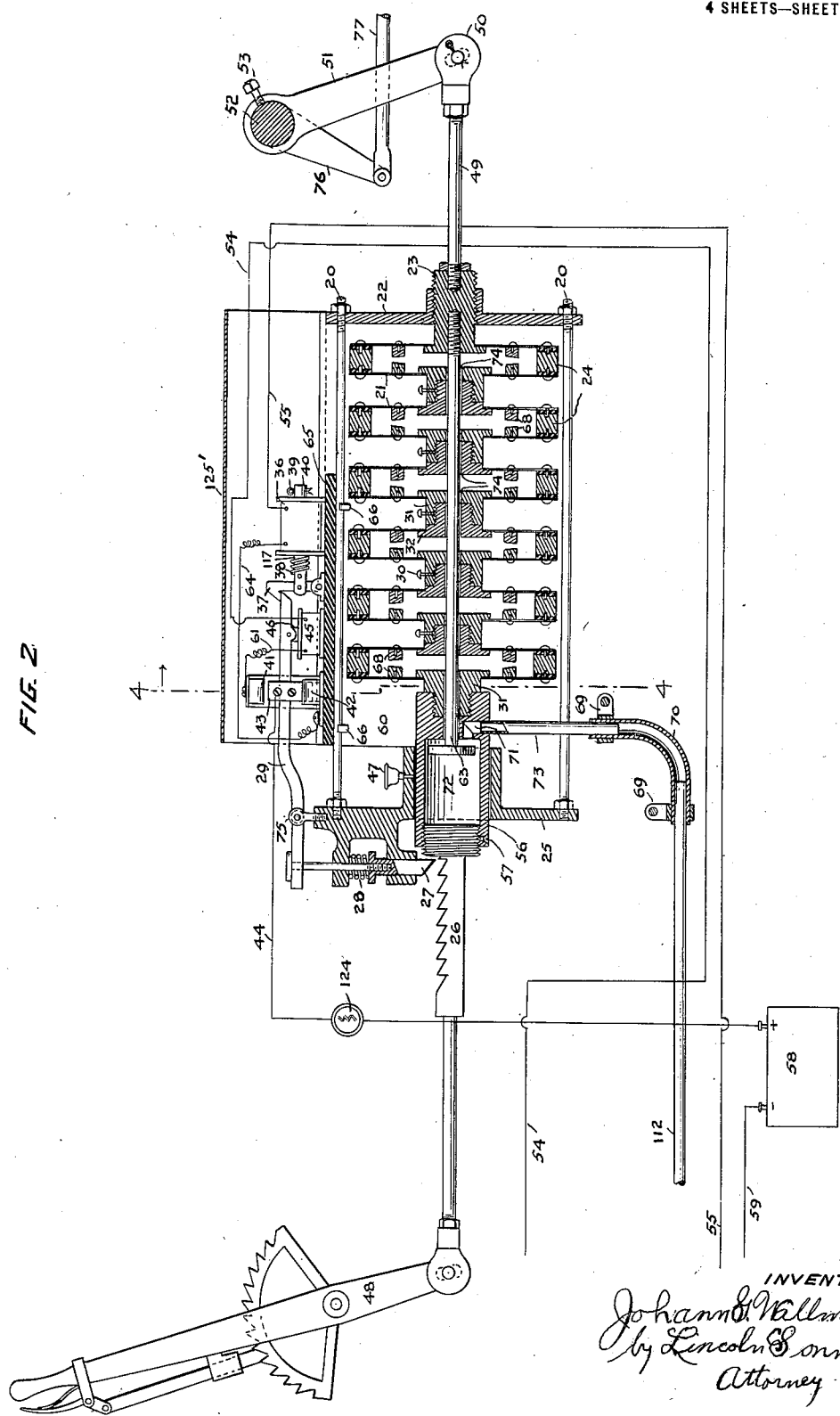

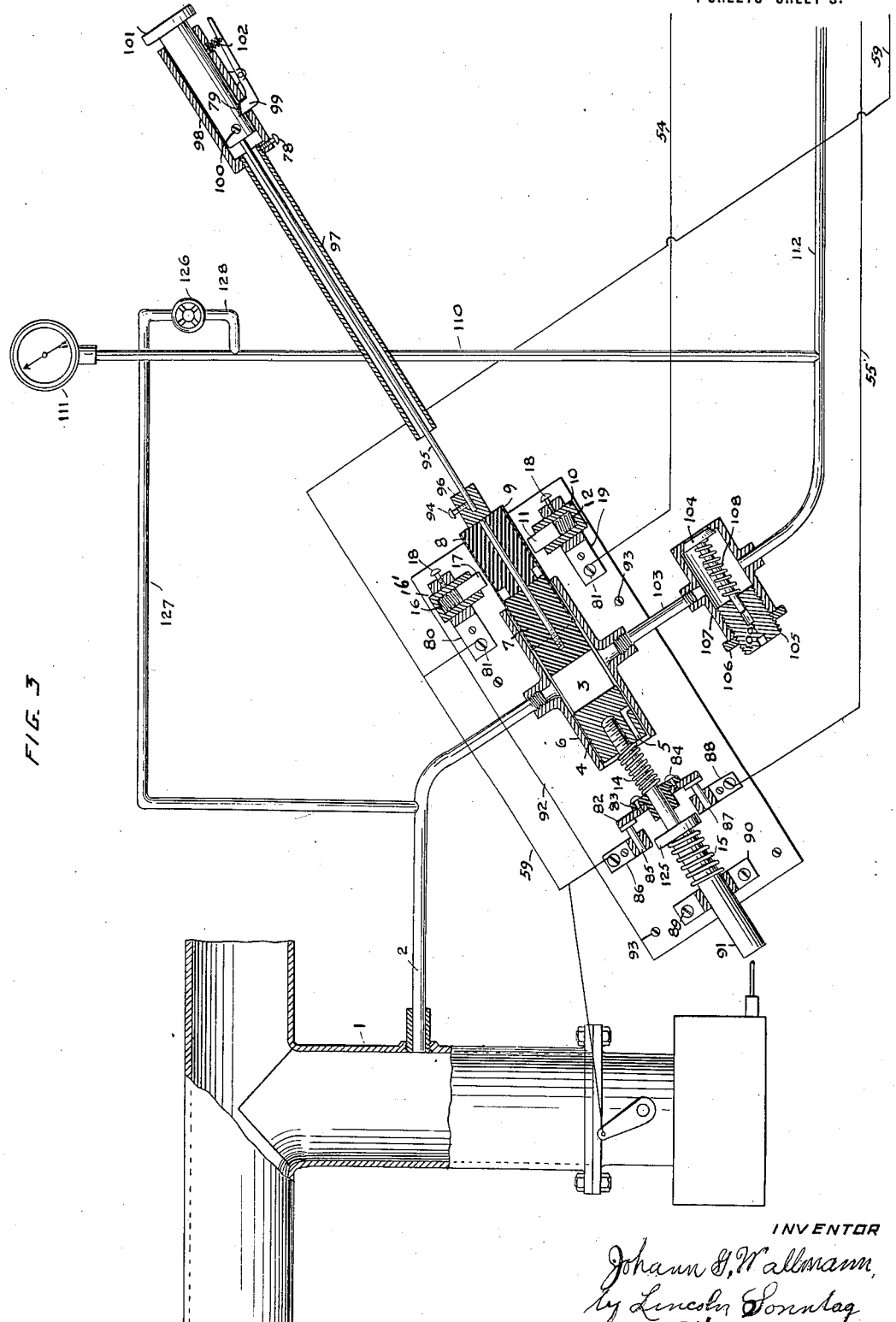

UNITED STATES PATENT OFFICE.

JOHANN G. WALLMANN, OF OAKLAND, CALIFORNIA.

MOTOR-CAR BRAKE.

1,250,397.  Specification of Letters Patent.  Patented Dec. 18, 1917.

Application filed May 9, 1916. Serial No. 96,391.

*To all whom it may concern:*

Be it known that I, JOHANN G. WALLMANN, a citizen of the United States, residing at the city of Oakland, in the county of Alameda and State of California, have invented certain new and useful Improvements in Motor-Car Brakes, of which the following is a specification.

My invention relates to improvements in combined brakes and automobile locks. The object of my invention is to provide a combined brake and automobile lock which can be readily operated by the occupant of the machine in which it is installed and which is very effective and not disposed to get out of order.

Referring to the accompanying drawing illustrating my invention, Figure 1 is a side elevation of my apparatus. Fig. 2 is a vertical sectional view of the same showing the diaphragms and their operating connections. Fig. 3 is a vertical sectional view of the brake operating mechanism. Fig. 4 is a section on line 4—4 of Fig. 2. Figs. 5 and 6 are sectional views of the diaphragms detached showing their normal and compressed position. Fig. 7 is a detail of the latch and solenoids of the apparatus. In the drawing 1 is an intake manifold adapted to be connected to a suitable gas motor. A pipe 2 extends from said manifold and terminates in the cylindrical part of the piston-valve 6. A passage way 3 is provided in the piston 4, and said piston also contains a by-pass 5. Fiber insulation 7 and 8 is connected to said piston by means of a rod extending through said insulation and secured therein as shown in Fig. 3 and said insulation is encircled by a metal ring 9. A metal brush 11 in proximity to said ring 9 is provided the same being slidably held by brush-holder 10 secured by means of a screw 18 and brush-holder base 19 to the instrument base 92. Said brush-holder contains a spring 12 engaging one end of said brush. A bearing 90 is secured to base 92 and shaft 91 is slidably supported in said bearing. Said shaft 91 has a shoulder 125 and a spiral spring 15 on said shaft 91 has one end engaging bearing 90 and its other end engaging shoulder 125.

A brush 17 is slidably supported in brush-holder 16′, a spring 16 in said brush-holder engaging one end of said brush. The brush-holder 16′ is secured in base 80 by screw 18, the said base being secured to instrument base 92 as shown. Contact pin bases 86 and 88 are secured to instrument base 92 on each side of shaft 91 and have openings therethrough in which contact pins 85 and 87 rest and are movable. Contact ring 82 engages said contact pins 85 and 87 and shaft 91 centrally extends therethrough and is slidable therein, and the apex of said shaft is held in piston 4, spring 14 being on said shaft and having one end engaging said piston and the other end engaging insulating bushing 83 through which said shaft extends and which is secured to ring 82 by screws 84. Valve casing 107 has a side branch in which pipe 103 is secured, said pipe also being secured in a branch of casing 6 so as to connect said casings 6 and 107. Casing 107 has an opposite branch from which the pipe 112 leads to connect the same with the diaphragms. Valve casing 107 has an adjusting screw entering one end thereof which screw has a guide hole 109 in which the valve stem having head 104 rests and is movable. Said head 104 has a seat in the other end of casing 107, and said stem is surrounded by spring 108 which engages said head at one end and screw, or plug, 105, at its other end. A lock nut 106 is upon plug 105 and engages the end of casing 107 which is penetrated by plug 105. A by-pass pipe 127 extends upwardly from pipe 2 and then laterally to a branch by-pass pipe 128 having a valve 126, said branch being connected to pipe 110 joined to the pipe 112 extending from casing 107. A combination bolt and locking post 96 extends into ring 9, and steel wire 95 is held in said post by screw 94 and runs in brass tubing 97 extending into the small cylinder 98. Screw 78 secures said tubing 97 in said cylinder 98, wherein push-button 101 works. Dog 99 is pivoted to cylinder 98, and has a spring 102 between cylinder 98 and the handle of said dog. Pipe 112 extends into rubber hose 70 from which a pipe 73 extends upwardly into the passage 71 leading to the chamber 72 in cylindrical coupling 56; clamps 69 maintain the hose 70 upon the pipes 73 and 112. The rod 63 supporting the piston in chamber 72 is screwed into brass coupling 23 and rod 49 connects said brass coupling to clevis 50 pivoted to brake arm 51 whose upper end is entered by shaft 52 securable by set screw 53. The brake-rod arm 76 being fastened upon shaft 52 is linked to brake rod 77. End plate 22, preferably of aluminum, wherein plug or coupling 23 is screwed is connected by rods 20, also preferably of aluminum, to forward end plate 25. Brake lever 48 is pivoted to notched connecting rod 26. Cylindrical coupling 56 is provided with set screw 57 for its connection with rod 26. Phosphor bronze disks or diaphragms 21 are supported by flange couplings 31 and 32 secured by set screws 30 and are provided with bumpers 68 to prevent them from collapsing. Rings 24 preferably of aluminum are endwise secured to said diaphragms. Passage-ways 74 extend through the couplings 31 and 32 for the movement of rod 63. Brackets for the support of the adjacent parts are designated 60, and clamps 66 and 67 are provided for the support of rods 20 (see Fig. 4). A fiber base 65 supports solenoid 45, screws 116 holding said solenoid to said base. A soft iron armature 46 is placed within said solenoid (as shown in Fig. 7), being pivoted to lever 29. The diaphragms shown are held in place by the rod 26 connected to lever 48 and the rod 49 connected to brake arm 51. The hose 70 is flexible so as to permit the forward and backward movement of the diaphragms and their housing.

When the diaphragms contract the part 25 supporting the dog 27 is forced forward on the part 56, in fact the whole housing including the end plate 22 is carried forward. The consequent contraction of the diaphragms will shorten the distance between the lower end of the brake lever 48 and the lower end of the brake arm 51, the lever 48 being held in place by the dog 27 and also arm 51 being carried forward, and the shaft 52 turning carries rod 63 forward and brake rod 77 as well. The brake rod 77 is connected to suitable brake bands. There is no movement of rod 26 when the diaphragms contract but a rearward movement of the rod 49, parts 20, 22 and 25 sliding forward on part 56 and dog 27 descending into its proper notch below.

Should the operator wish to apply the brakes by means of the lever 48 instead of the other method described, he will pull the handle of said lever so the rod 26 is caused to move forwardly with the cylinder 56, which slides in the slideway of part 25 and consequently expands the diaphragms until the head on stem 63 contacts with the forward end of part 72, the diaphragms with their housing as well as rod 49 being drawn forward, the brakes are applied by means of arms 51 and 76 and rod 77. The end of lever 29 is inclined to engage dog 37 as shown, said dog 37 being pivotally connected to soft iron armature 117. Said iron armature 117 has a guide end 40, which has a cotter pin 39. Insulating material 120 is placed between solenoid 36 and armature 117 and electric wire 55 leads to said solenoid 36. The coil 36 has a brass lining 121. Screws 118 secure a bracket to base 65 as shown, said bracket being pivotally secured to dog 37. A spring 38 surrounds armature 117 and is connected thereto to support dog 37. An electric wire 64 also leads to solenoid, 36. Coil 36 has fiber end pieces 123. Fiber gaskets 35 lie between rings 24 and diaphragms 21, being secured by screws 33. Screws 34 hold separators 68. Fiber insulation 62 is between part 29 and suitable blade 43, being secured by screws as shown. 41 and 42 are switch forks for engagement with lever 29 being secured by arms to brackets as shown in Fig. 4 wherein the electrical connection by wires 64, 61 and 44 is also shown. The clamps for rod 20 secured to bracket 60 are designated 67. Dog 27 is engageable with the teeth of rod 26, said dog being secured to the vertical rod supported by lever 29 connected to rocker bearing 75, said dog 27 being slidable in the slideway in the brackets as shown in Fig. 2, a spring 28 in said bracket bearing against a shoulder connected to said dog. A grease cup 47 feeds vertically as shown in said Fig. 2.

*Vacuum brake and gasolene car lock.*

The device can be placed on any gasolene car by removing the brake rod connecting the hand lever 48 with arm 51 as shown, and in its place putting the assembled diaphragms as shown in Fig. 2. The intake manifold of the gas motor is tapped and a pipe 2 is connected to the manifold and run to and tapped into the piston valve as shown. The pipe line 103 is continued and connected to the vacuum pop valve. Pipe line 112, hose 70 and pipe 73 are connected to the vacuum brake. Branch pipe 110 is run from line 112 to vacuum gage 111 located on the instrument board of the auto. Wire 44 is run from the automatic switch blade 43 to switch 124, then to the battery 58. Electric wire 54 is run from solenoid 45 to brush base 19. Electric wire 55 is run from solenoid 36 to the contact base 88. Electric wire 59 connects one terminal of the battery 58 to the brush base 80 and the contact base 86.

The device is operated in the following manner. The motor being started creates a partial vacuum in intake manifold 1. By releasing the clutch to the motor and pressing down on the push button 101 (located on the steering wheel column) you cause the piston 4 with its parts to be moved forward against the heavy spiral spring 15. Dog 99 dropping into notch 79 causes the button 101 to be held down. This forward movement of the piston 4 in the cylinder 6 causes the aperture 3 in the piston 4 to be carried forward so as to allow a passage way between the manifold 1 and the diaphragms, causing a partial vacuum to be formed in the diaphragms and causing the disks 21 to be drawn inwardly as shown in Fig. 6. This contraction of the diaphragms causes the part 25 to move forwardly on the part 56, the head on part 63 going forward in the play chamber 72. This forward movement of the part 25 causes the arm 51 to be drawn forward turning the shaft 52, which in turn causes the arm 76 to be turned forward, drawing on the rod 77 which tightens the brake band on the brake drum on the rear wheels of the machine.

Simultaneously on the forward movement of the pushbutton 101, the contact ring 82 is forced down against the contact pins 85 and 87 closing the electric circuit as follows:— from battery 58 over wire 59, over contact base 86, through contact pin 85, over contact ring 82, through contact pin 87, over wire 55, through solenoid coil 36 over wire 64, through switch fork 42, over switch blade 43, over wire 44, through switch 124, thence over the wire to the opposite pole of the battery 58. The closing of this circuit causes the solenoid 36 to draw the soft iron core 117 inwardly against the spring 38, releasing the dog 37 from the part 29. The rear end of the arm 29 is carried upward by the downward movement of the dog 27, the dog 27 being driven down by the spring 28. As the rear end of the arm 29 rises, it carries the switch blade 43 out of the switch fork 42, up into the switch fork 41, thereby breaking the circuit through the solenoid 36. The dog dropping into the notches in the part 26 will hold the brake on after the motor is stopped, thereafter lever 48, being put into a released position by its handle being pushed forward so that the dog 27 will rest in the forward or left-hand notch of the bar 26.

The brake is released in the following manner. By pressing on the arm of the dog 99 you release the pushbutton 101, which is forced out and up by the heavy spring 15 bearing against the shoulder of the part 91, the part 91 being connected to the piston 4, it in turn being connected to the push button 101 by the wire 95 and the connecting rod 96. In this backward movement of the piston 4 the contact ring 82 is carried back from the contact points 85 and 87 and by the shoulder 125, simultaneously the piston valve closes the manifold connections, the by-pass 5 allowing air to enter the diaphragms via the pipes 103, 112, 73 and hose 70, chamber 72 and passageways 74. The insulated ring 9 passing under the brushes 11 and 17 closes the following circuits:— from battery 58 over wire 59 to brush holder 80, through brush 17, through insulated ring 9, through brush 11, through brush holder 19, over wire 54, through solenoid 45, through wire 61, through switch fork 41, through switch blade 43, over wire 44, through switch 124, thence to the opposite pole of polarity of the battery. The current passing through the solenoid 45 causes the soft iron core 46 to be drawn downward, the part 29 catching under the dog 37. As the rear end of the arm 29 moves down the switch blade 43 leaves the switch fork 41 and passes into the switch fork 42. The rear end of the lever 29 being pulled down by the solenoid 45 and held down by the dog 37 releases the dog 27 from the notches in the member 26. The by-pass 5 allowing air to enter the diaphragms and the dog 27 being released the diaphragms will spring back to their normal shape as shown in Fig. 5. While in this position they release their pull on the brake arm 51 releasing the brake.

111 is a vacuum gage set on the instrument board and is used to indicate when brakes are on or off, also to indicate if there is any leak on the pipe lines.

The apparatus does not interfere with the use of the hand brake. By pulling back on the lever 48 the part 26 pulls forward on the part 56 and the head on rod 63 bearing on the shoulder in the part 56 causes the rod 49 to draw forward the arm 51 thus putting on the brakes. The air enters and is drawn out from one diaphragm to another through the space 74 between the coupling and the rod 63. To secure your car against theft push down the button 101 thereby dropping locking dog 27 into the notches on rod 26 and open the key valve 126 and then turn off the switch 124; it will then be impossible to start the car as the brakes are set and the current will have to be switched on to release the dog 27 said dog being operable electrically only as explained. The driver having the keys makes it impossible to take the car. Upon starting the motor a constant vacuum is drawn on the diaphragms through the bypass pipe 127, valve 126 and pipe 128 and when the clutch of the motor is let in to start the car it will stall the motor on account of the brakes being locked. When wishing to release brake, close by-pass valve 126 and close switch 124. 58 represents an electric battery. A casing over the solenoids is designated 125' as shown in Fig. 2.

I claim:

1. In a motor car a manifold, a cylinder, a piston in said cylinder having a lateral passage way, a tube laterally connecting said manifold with one side of said cylinder, a slidable shaft joined to said piston, means for resiliently holding said piston in an expansible position, insulation in engagement with one end of said piston, a post outwardly connected to said insulation, a push button, a rod connecting said post with said push button, a resiliently acting dog engageable with said push button for locking the same, a ring encircling said insulation, oppositely positioned metal brushes in proximity to said ring, a valve on the other side of said cylinder, a tube connecting said cylinder with said valve, and tubing leading outwardly from said valve and in connection with the tube connecting said manifold with said cylinder.

2. In a motor car a manifold, a cylinder, a piston in said cylinder having a lateral passage way, a tube laterally connecting said manifold with one side of said cylinder, a slidable shaft joined to said piston, a ring surrounding said shaft, contact pins on each side of said shaft engageable with said ring, means for resiliently holding said piston in an expansible position, insulation in engagement with one end of said piston, a post outwardly connected to said insulation, a push button, a rod connecting said post with said push button, a resiliently acting dog engageable with said push button for locking the same, a ring encircling said insulation, oppositely positioned metal brushes in proximity to said ring, a valve on the other side of said cylinder, a tube connecting said cylinder with said valve and tubing, including means for closing the passage, leading outwardly from said valve and in connection with the tube connecting said manifold with said cylinder.

3. In a motor car the combination of a manifold, a cylinder, a piston in said cylinder having a lateral passage way, a tube laterally connecting said manifold with said cylinders, a slidable shaft connected to said piston, means for resiliently holding said piston in an expansible position, insulation in engagement with one end of said piston, a post connected to said insulation, a cylindrical casing surrounding said insulation oppositely positioned spring-pressed metal brushes in proximity to said casing, a push button, a rod connecting said post with said push button, a resiliently acting dog engageable with said push button for locking the same, an insulated bushing surrounding said slidable shaft, a contact ring encircling said bushing, contact pins on each side of said shaft engageable with said ring, a valve on the other side of said cylinder, a tube connecting said cylinder with said valve, tubing, including means for closing the passage, leading outwardly from said valve and in connection with the tube connecting said manifold with said cylinder, a coupling connecting a chamber, a pipe connecting said tubing with said chamber, a brake lever, a toothed rod connecting said brake lever with said coupling, a casing having a forward and rear end plate, a rod having a head in said chamber and secured inwardly to said rear end plate, a plurality of diaphragms between said coupling and said rear end plate, a rod extending outwardly from said rear end plate, a crank keyed to said rear end plate, a brake rod connected to said crank, a solenoid having an armature projecting therefrom, a dog linked to said armature, a lever engageable with said dog, a solenoid in connection with the last mentioned lever, a vertically acting pawl supported by said lever, engageable with said toothed rod, a switch, current conducting means for energizing said brushes, and said contact pins, and current conducting means for energizing said solenoids and said switches.

4. In a motor car the combination of a manifold, a cylinder, a piston in said cylinder having a lateral passage way and a by-pass, a tube laterally connecting said manifold with one side of said cylinder, a slidable shaft having a collar connected to said piston, insulation in engagement with one end of said piston, a post connected to said insulation, a push button, a rod connecting said post with said push button, a resiliently acting dog engageable with said push button for locking the same, a casing encircling said insulation, oppositely positioned spring-pressed metal brushes in proximity to said casing, a valve on the other side of said cylinder, a tube connecting said cylinder with said valve, an insulated bushing surrounding said slidable shaft, a contact ring encircling said bushing, contact pins on each side of said shaft engageable with said ring, closable tubing leading outwardly from said valve and in connection with the tube connecting said manifold with said cylinder, a spring on said shaft in engagement with said collar, a spring on said shaft engaging said bushing and said piston, a coupling containing a chamber, a pipe connecting said tubing with said chamber, a brake lever, a toothed rod connecting said brake lever with said coupling, a casing having a forward and a rear end plate, a rod having a head in said chamber and secured inwardly to said rear end plate, a plurality of diaphragms between said coupling and said rear end plate, endwise provided with rings, a rod extending outwardly from said rear end plate, a crank keyed to said rod, a brake rod connected to said crank, a solenoid having an armature projecting therefrom, a dog linked to said armature, a lever engageable with said dog, a solenoid in connection with the last mentioned lever, a vertically acting pawl supported by said lever engageable with said toothed rod, a switch having a blade and an upper and lower fork engageable with said blade, current conducting means for energizing said brushes and said contact pins, and current conducting means for energizing said solenoids and said switches.

5. In a motor car the combination of a lever provided with a toothed bar, a casing opposed to said bar, a plurality of diaphragms engageable with said casing, a rod extending through said diaphragms, having a head in said casing, means for actuating a brake connected with said rod, and means for electrically controlling a pawl engageable with said toothed bar for setting said lever.

6. In a motor car the combination of a lever provided with a toothed bar, a casing opposed to said bar, a plurality of diaphragms engageable with said casing, a rod extending through said diaphragms having a head in said casing, tubing opening into said casing, means for actuating a brake connected with said rod, and means for electrically controlling a pawl engageable with said toothed bar for setting said lever.

7. In a motor car, an arm provided with a vertically acting pawl, a switch blade carried by said arm, an upper and a lower fork engageable by said blade, and means for conducting electric current to said blade and said forks.

In testimony whereof I affix my signature in presence of two witnesses.

JOHANN G. WALLMANN.

Witnesses:
J. B. KNOWLES,
W. H. JORDAN.